US000001930H

(19) United States

(12) Statutory Invention Registration (10) Reg. No.: US H1930 H

Crabtree (43) Published: Jan. 2, 2001

(54) PRECURSOR WARHEAD ATTACHMENT FOR AN ANTI-ARMOR ROCKET

(75) Inventor: Larry E. Crabtree, Falmouth, VA (US)

(73) Assignee: The United States of America as represented by the Secretary of the Navy, Washington, DC (US)

(21) Appl. No.: 09/115,600

(22) Filed: Jul. 15, 1998

(51) Int. Cl.[7] ..... F42B 12/10; F42B 12/18

(52) U.S. Cl. ..... 102/476; 102/210; 102/308

(58) Field of Search ..... 102/306–310, 102/210, 476

(56) References Cited

U.S. PATENT DOCUMENTS

| | | | | |
|---|---|---|---|---|
| 4,854,240 | * | 8/1989 | Hirsch et al. | 102/476 |
| 4,967,666 | * | 11/1990 | Kellner et al. | 102/476 |
| 5,003,883 | | 4/1991 | Mixon et al. | 102/476 |
| 5,166,469 | * | 11/1992 | Kerdraon et al. | 102/210 |
| 5,303,654 | * | 4/1994 | Held | 102/476 |
| 5,309,843 | | 5/1994 | Rentzsch et al. | 102/476 |
| 5,331,895 | * | 7/1994 | Bourne et al. | 102/307 |
| 5,394,804 | * | 3/1995 | Cauchetier | 102/476 |
| 5,415,105 | * | 5/1995 | Voss et al. | 102/476 |
| 5,565,647 | * | 10/1996 | Kerdraon et al. | 102/476 |
| 5,750,917 | * | 5/1998 | Seckler et al. | 102/476 |

FOREIGN PATENT DOCUMENTS

| | | | | |
|---|---|---|---|---|
| 3010-917 A1 | * | 1/1981 | (DE) | 102/476 |
| 3605580 | * | 6/1987 | (DE) | 102/476 |
| 004135392 | * | 4/1993 | (DE) | 102/476 |
| 000497394 | * | 8/1992 | (EP) | 102/476 |
| 2603375 | * | 3/1988 | (FR) | 102/476 |
| 1051407 | * | 12/1966 | (GB) | 102/476 |
| 2244797 | * | 12/1991 | (GB) | 102/476 |
| 404198696 | * | 7/1992 | (JP) | 102/476 |
| 9114917 | * | 10/1991 | (WO) | 102/476 |

* cited by examiner

*Primary Examiner*—Harold J. Tudor

(74) *Attorney, Agent, or Firm*—James B. Bechtel, Esq.

(57) ABSTRACT

A precursor warhead for a high-explosive, anti-armor (HEAA) warhead is provided. The precursor warhead is a cylindrically-shaped attachment adapted for a friction fit over the nose cone of existing HEAA warheads. The precursor warhead has an instantaneous fuse which initiates a precursor penetrator which causes early detonation of reactive armor, thereby protecting the main charge and penetrator on the HEAA round from damage. The precursor warhead replaces the existing crush switch on the HEAA round and also initiates, with appropriate time delay, the main explosive charge.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRECURSOR WARHEAD ATTACHMENT FOR AN ANTI-ARMOR ROCKET

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention described herein relates to shoulder-launched rocket rounds and in particular to rocket rounds having modifications to defeat reactive armor.

BACKGROUND OF THE INVENTION

Existing high explosive anti-armor (HEAA) warheads are ineffective against some armored vehicles which employ explosive reactive armor. In particular, the SMAW HEAA warheads effectiveness can be greatly degraded by the addition of explosive reactive armor on enemy armored vehicles. Typically, this reactive armor is supported by a stand-off structure attached to the armored vehicle. When an anti-armor round strikes the reactive armor, the reactive armor immediately explodes. The armored vehicle is unharmed because (1) the reactive armor has a stand-off location and (2) there is no penetrator or shaped charge. The incoming round, however, lacks both the stand-off (since the reactive armor explodes on contact) and the hardened structure of the armored vehicle. The incoming round is severely damaged, disabling both the fusing mechanisms and the penetrator. In fact, the penetrator often does not even form. As a result of the effectiveness of the reactive armor, a means is needed to detonate the reactive armor prior to the anti-armor round impact. Although specialty rounds have been built for detonating reactive armor, a need remains to provide a simple modification of existing munitions to accomplish the same purpose. In particular, a modification is needed for the high explosive anti-armor round used in the Shoulder-Launched, Multiple-Purpose Assault Weapon (SMAW).

SUMMARY OF THE INVENTION

It is an object of the invention to provide a precursor warhead for attachment to an anti-armor rocket round.

It is a further object of the invention to provide a precursor warhead having an instantaneous contact fuse.

It is another object of the invention to provide a precursor warhead adaptable to the existing high-explosive anti-armor (HEAA) fuse.

Accordingly, the invention is a precursor warhead for attachment for an anti-armor rocket having a small shaped charge and formed to be friction-fit to the forward end of a HEAA round. The precursor warhead contains a cylindrically-shaped charge in a casing having a hollow cylindrical center section, the hollow center section fitting over a HEAA round nose cone. The forward end of the precursor warhead contains a rearward facing conical charge which, when detonated, forms a forward-extending, rod-like mini-penetrator. This mini-penetrator detonates the reactive armor of an armored vehicle upon first contact of the HEAA round. Because the mini-penetrator causes immediate detonation of the reactive armor, the stand-off distance of the HEAA round nose section is sufficient to protect the HEAA round from damage. It is not necessary to employ delay timers and the like. As a result, the precursor warhead is suitable for use on a variety of warheads despite differences in impact velocity of the various rounds. The precursor warhead initiation is accomplished in place of the standard crush fuse option of the HEAA round.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
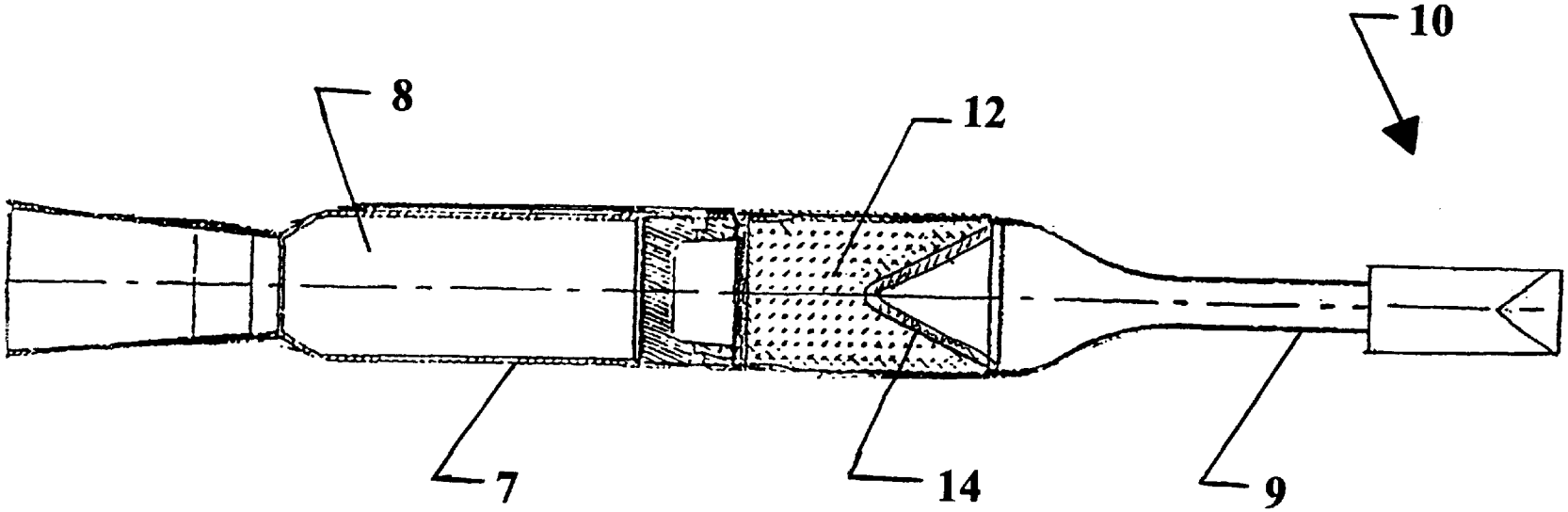
FIG. 1 is a side view of a high-explosive, anti-armor round showing the precursor warhead attached to the nose cone.

Referring to FIG. 1, a cross-sectional side view of a HEAA round 7 is shown with its major components and the precursor warhead of this invention, designated generally by the reference numeral 10. The major components of the HEAA round 7 include the rocket motor 8, the shaped charge 12 with the penetrator 14 attached and the nose cone 9. When the HEAA round 7 impacts an armored vehicle or hardened target, the penetrator 14 is explosively formed into an elongated projectile (from its shown conical shape) inverting the cone and driving the now, rod-like penetrator through the defensive armor at very high velocities. The mini-penetrator can be manufactured of tantalum or molybdenum in order to achieve higher velocities.

In order to defeat the HEAA round, reactive or exploding armor has been employed. The typical configuration of a reactive armored vehicle includes a stand-off support structure attached to the outside surfaces of the turret, side, fore and aft hulls and other vulnerable areas. Explosive charges are mounted on the support structures, typically presenting an oblique surface to an incoming HEAA round. When an incoming round strikes the reactive armor, an upward directed blast shears the nose cone 9 away, and destroys the integrity of the shaped charge 12 and the penetrator 14. Typically the HEAA round is blown apart from beneath, driving the shaped charge 12 and penetrator 14 upward, and preventing formation of the penetrator rod. The small precursor warhead 10 is designed to negate the reactive armor, if any, and to avoid damage to the penetrator whether or not reactive armor is present.

Figure 2:
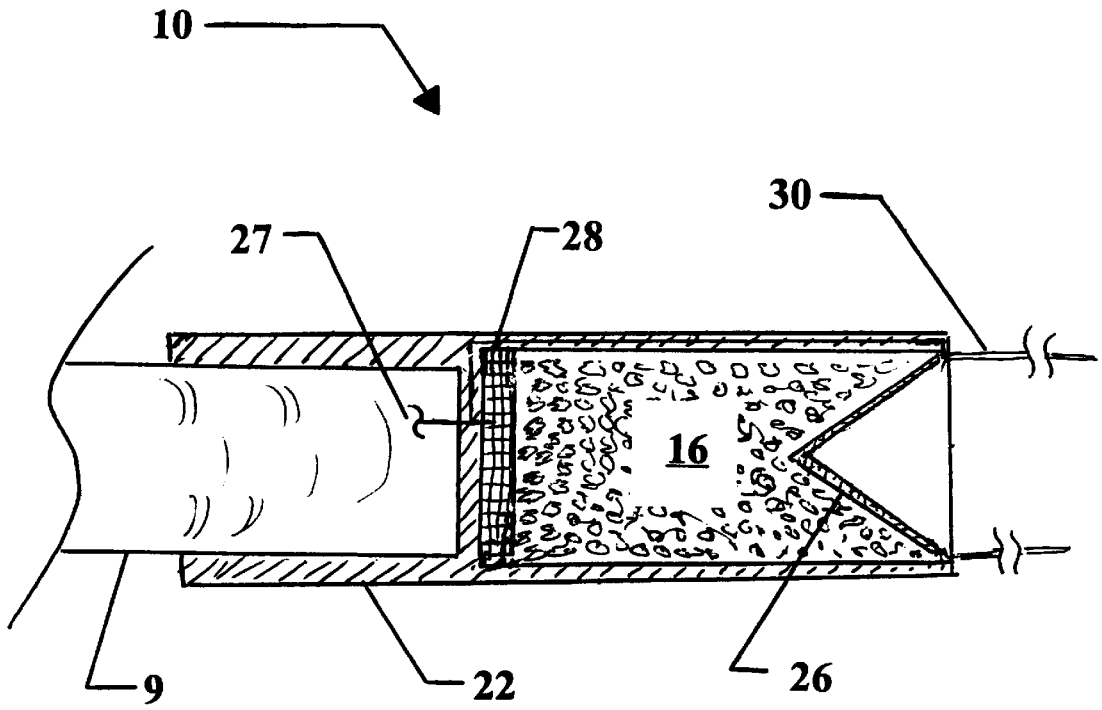
FIG. 2 is a sectional side view of the precursor warhead showing the major components.

FIG. 2 shows a cross-sectional side view of the precursor warhead 10. For reference, a portion of the HEAA round nose cone 9 is shown. The precursor warhead 10 is attached to the nose cone 9 by a friction fit between the precursor casing 22 and the nose cone 9. The cylindrical precursor casing 22, fabricated of high-temperature aluminum, serves not only as a friction fitting, but also as a blast shield preventing the rearward blast of the precursor explosive charge 16 or the fusing mechanism at the rear of the precursor charge from coming down the nose cone tube. Initiation is provided by the initiator material 28 which provides rapid initiation of the precursor explosive charge 16, in turn forming the mini-penetrator 26. The initiator material 28 is, itself, ignited by a series of forward projecting fuses 30. In the preferred embodiment, the forward projecting fuses 30 are piezo-electric percussion fuses. The depicted fuses are representative only and are not the actual configuration.

The crush switch was removed from the SMAW HEAA round and the precursor was added in its place. When an armored target is engaged which employs explosive reactive armor, the precursor warhead initiates on contact. This initiation results in the formation of a mini-penetrator which detonates the explosive reactor armor, thus eliminating it from the armored vehicle. Also, when the precursor warhead initiates, a simultaneous signal via connection 27 is sent to the main charge warhead which results in its simultaneous initiation. The standoff distance of the main warhead and difference in penetrator velocity allows time for the explosive reactive armor to clear the vehicle thereby allowing the main charge warhead to engage the base armor, that is, the armor under the explosive reactive armor.

The precursor warhead 10 has an energetic charge and a smaller, reduced mass, mini-penetrator. As a result, the shaped precursor charge provides a much more rapidly formed penetrator delivered at a much higher velocity. Because of the difference in detonation and penetrator velocities (the precursor operating at higher velocities) is possible. The operation of the invention may be more fully seen from FIGS. 3 or 4.

OPERATION OF THE INVENTION

Figure 3:
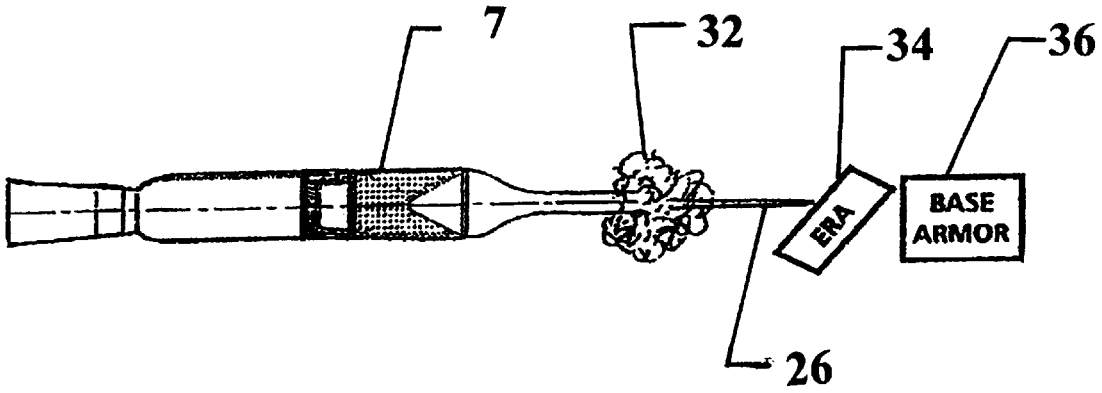
FIG. 3 is a side view showing the operation of the precursor warhead during impact with reactive armor.

Referring now to FIG. 3, a sketch depicts an HEAA round 7 making contact with an explosive reactive armor 34. The base armor 36, for example, a tank turret, is located for reference. Upon contact with the reactive armor 34, the precursor warhead generates a precursor detonation 32 which, in turn, generates the precursor mini-penetrator 26. This mini-penetrator 26 immediately initiates the reactive armor 34, detonating it prior to arrival of the HEAA round 7.

Figure 4:
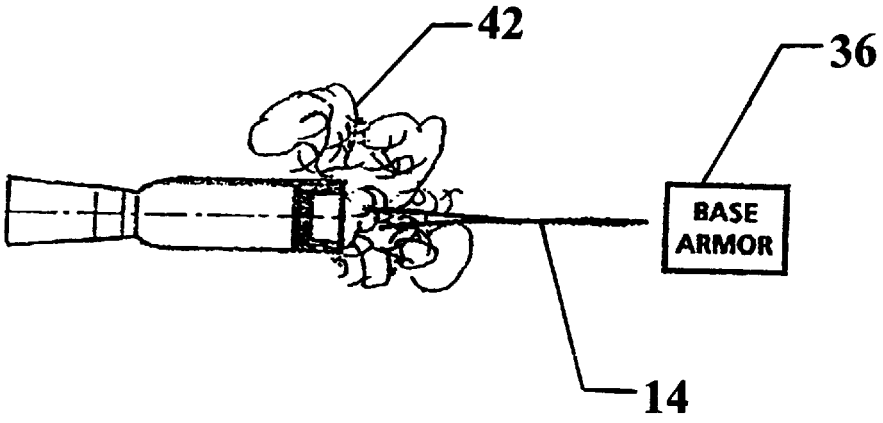
FIG. 4 is a side view showing the operation of the standard warhead after the precursor warhead has neutralized the reactive armor.

Shortly thereafter, as shown in FIG. 4, the main warhead explodes creating detonation 42 which, in turn, forms and drives the penetrator 14 into the base armor 36. By clearing the reactive armor, in this manner, the usual functioning of the armor piercing round is accomplished.

The advantages and features of the invention are numerous. The precursor warhead attachment allows the easy modification of a large inventory of existing HEAA rounds. The addition of a precursor warhead to the existing SMAW HEAA warhead provides the added capability of defeating armored vehicles which employ explosive reactive armor. This will allow the user the opportunity to successfully engage some armored vehicles which employ explosive reactive armor. There is no capability now for the SMAW HEAA warhead to defeat armored vehicles with explosive reactive armor installed. The new features of this warhead system is the addition of a precursor warhead and the associated fuzing and timing delays necessary to for its proper function.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A precursor warhead attachment for a high-explosive, anti-armor round comprising:
   - a one-piece casing having a combined blast shield and friction fitting adapted to attach to a nose cone of a high-explosive, anti-armor round;
   - a shaped, explosive charge located within said casing;
   - an initiator located within said casing and in physical contact with said explosive charge; and
   - a plurality of fuses attached to said casing and extending forward thereof, said plurality of fuses functionally connected to said initiator.

2. A precursor warhead attachment for a high-explosive, anti-armor round as in claim 1 wherein said casing further comprises a cylindrical casing.

3. A precursor warhead attachment for a high-explosive, anti-armor round as in claim 1 wherein said casing is fabricated using high temperature aluminum.

4. A precursor warhead attachment for a high-explosive, anti-armor round as in claim 1 wherein said shaped, explosive charge has a forward-facing conical surface fabricated using tantalum.

5. A precursor warhead attachment for a high-explosive, anti-armor round as in claim 1 wherein said explosive charge has a forward-facing conical surface fabricated using molybdenum.

6. A precursor warhead attachment for a high-explosive, anti-armor round as in claim 1 wherein said plurality of fuses are piezoelectric percussion fuses.

* * * * *